(12) United States Patent
Inukai et al.

(10) Patent No.: US 12,398,245 B2
(45) Date of Patent: Aug. 26, 2025

(54) METHOD FOR PRODUCING RESIN PARTICLE DISPERSION, METHOD FOR PRODUCING TONER FOR ELECTROSTATIC IMAGE DEVELOPMENT, AND TONER FOR ELECTROSTATIC IMAGE DEVELOPMENT

(71) Applicant: FUJIFILM Business Innovation Corp., Tokyo (JP)

(72) Inventors: Takashi Inukai, Kanagawa (JP); Keita Yamamoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 566 days.

(21) Appl. No.: 17/462,467

(22) Filed: Aug. 31, 2021

(65) Prior Publication Data

US 2022/0306814 A1   Sep. 29, 2022

(30) Foreign Application Priority Data

Mar. 26, 2021   (JP) .................. 2021-054288

(51) Int. Cl.
*C08J 3/05*   (2006.01)
*G03G 9/08*   (2006.01)
*G03G 9/087*   (2006.01)

(52) U.S. Cl.
CPC .............. *C08J 3/05* (2013.01); *G03G 9/0806* (2013.01); *G03G 9/08755* (2013.01); *C08J 2367/02* (2013.01)

(58) Field of Classification Search
None
See application file for complete search history.

(56) References Cited

U.S. PATENT DOCUMENTS 9,964,880 B1 * 5/2018 Romano, IV .............. C08J 3/14

FOREIGN PATENT DOCUMENTS

| EP | 3 287 481 A1 | | 2/2018 |
|---|---|---|---|
| JP | 6-282112 A | | 10/1994 |
| JP | 2005105018 A | * | 4/2005 |
| JP | 2008-063426 A | | 3/2008 |
| JP | 2009069535 A | * | 4/2009 |
| JP | 2010-77319 A | | 4/2010 |
| JP | 2017-144395 A | | 8/2017 |
| JP | 2018-513264 A | | 5/2018 |

OTHER PUBLICATIONS

JP-2005105018-A translation (Year: 2023).*
Ethyl Acetate properties NIST, https://webbook.nist.gov/cgi/cbook.cgi?ID=C141786&Mask=4 (Year: 2023).*
JP-2009069535-A Translation (Year: 2024).*
Communication ("Notice of Reasons for Refusal") issued Jan. 14, 2025 for Japanese Patent Application No. 2021-054288.
Communication ("Notice of Reasons for Refusal") issued Jan. 24, 2025 for Japanese Patent Application No. 2021-054288.

* cited by examiner

*Primary Examiner* — Peter L Vajda
*Assistant Examiner* — Charles Collins Sullivan, IV
(74) *Attorney, Agent, or Firm* — Sughrue Mion, PLLC

(57) ABSTRACT

A method for producing a resin particle dispersion includes: preparing a phase-inverted emulsion by phase inversion emulsification of a resin using an organic solvent and an aqueous medium; and removing the organic solvent from the phase-inverted emulsion contained in a distillation tank by reduced pressure distillation. During the reduced pressure distillation, the rate of pressure reduction in an environment in which the pressure inside the distillation tank is equal to or higher than vapor pressure and equal to or lower than (the vapor pressure+5 kPa) when the concentration of the organic solvent in the phase-inverted emulsion is in the range of 30% by mass or less to 1% by mass or more is from 0.01 kPa/min to 0.5 kPa/min inclusive until the pressure inside the distillation tank reaches a preset reduced pressure for the reduced pressure distillation.

11 Claims, No Drawings

METHOD FOR PRODUCING RESIN PARTICLE DISPERSION, METHOD FOR PRODUCING TONER FOR ELECTROSTATIC IMAGE DEVELOPMENT, AND TONER FOR ELECTROSTATIC IMAGE DEVELOPMENT

CROSS-REFERENCE TO RELATED APPLICATIONS

This application is based on and claims priority under 35 USC 119 from Japanese Patent Application No. 2021-054288 filed Mar. 26, 2021.

BACKGROUND

(i) Technical Field

The present disclosure relates to a method for producing a resin particle dispersion, to a method for producing a toner for electrostatic image development, and to a toner for electrostatic image development.

(ii) Related Art

For example, Japanese Unexamined Patent Application Publication No. 2017-144395 discloses "a solvent collection device including: a heating bath including agitating means and heating means; an evaporated vapor passage unit; an evaporated vapor condensing unit; a condensate collection unit; and pressure-reducing means, wherein the evaporated vapor passage unit includes at least two pipes having different angles, wherein a first one of the pipes in the evaporated vapor passage unit is disposed so as to be inclined with respect to the flow direction of a liquid flowing toward the heating bath, and wherein a second one of the pipes that is directly connected to the heating bath includes a dead end portion disposed at an end of the pipe that is opposite, relative to the traveling direction of the evaporated gas, to the end thereof to which the heating bath is connected and a connection portion connected to the first pipe and disposed on the heating bath side of the dead end portion of the second pipe."

SUMMARY

Aspects of non-limiting embodiments of the present disclosure relate to a resin particle dispersion production method including: preparing a phase-inverted emulsion by phase inversion emulsification of a resin using an organic solvent and an aqueous medium; and removing the organic solvent from the phase-inverted emulsion contained in a distillation tank by reduced pressure distillation. With this method, the yield of the resin particle dispersion is higher than that when the rate of pressure reduction during the reduced pressure distillation in an environment in which the pressure inside the distillation tank is equal to or higher than vapor pressure and equal to or lower than (the vapor pressure+5 kPa) when the concentration of the organic solvent in the phase-inverted emulsion is in the range of 30% by mass or less to 1% by mass or more is less than 0.01 kPa/min or higher than 0.5 kPa/min until the pressure inside the distillation tank reaches a preset reduced pressure for the reduced pressure distillation. Moreover, the resin particle dispersion includes resin particles having a narrower particle size distribution.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a resin particle dispersion production method including: preparing a phase-inverted emulsion by phase inversion emulsification of a resin using an organic solvent and an aqueous medium; and removing the organic solvent from the phase-inverted emulsion contained in a distillation tank by reduced pressure distillation, wherein, during the reduced pressure distillation, the rate of pressure reduction in an environment in which the pressure inside the distillation tank is equal to or higher than vapor pressure and equal to or lower than (the vapor pressure+5 kPa) when the concentration of the organic solvent in the phase-inverted emulsion is in the range of 30% by mass or less to 1% by mass or more is from 0.01 kPa/min to 0.5 kPa/min inclusive until the pressure inside the distillation tank reaches a preset reduced pressure for the reduced pressure distillation.

DETAILED DESCRIPTION

Exemplary embodiments of the present disclosure will be described below. The description and Examples are illustrative of the present disclosure and are not intended to limit the scope of the present disclosure.

In the present specification, a numerical range represented using "to" means a range including the numerical values before and after the "to" as the minimum value and the maximum value, respectively.

In a set of numerical ranges expressed in a stepwise manner in the present specification, the upper or lower limit in one numerical range may be replaced with the upper or lower limit in another numerical range in the set. Moreover, in a numerical range described in the present specification, the upper or lower limit in the numerical range may be replaced with a value indicated in an Example.

In the present specification, the term "step" is meant to include not only an independent step but also a step that is not clearly distinguished from other steps, so long as the prescribed purpose of the step can be achieved.

In the present specification, when an exemplary embodiment is explained with reference to the drawings, the structure of the exemplary embodiment is not limited to the structure shown in the drawings. In the drawings, the sizes of the components are conceptual, and the relative relations between the components are not limited to these relations.

In the present specification, any component may contain a plurality of materials corresponding to the component. In the present disclosure, when reference is made to the amount of a component in a composition, if the composition contains a plurality of materials corresponding to the component, the amount means the total amount of the plurality of materials, unless otherwise specified.

In the present specification, the "toner for electrostatic image development" may be referred to simply as a "toner."

<Resin Particle Dispersion Production Method>

A resin particle dispersion production method according to an exemplary embodiment includes the steps of: preparing a phase-inverted emulsion by phase inversion emulsification of a resin using an organic solvent and an aqueous medium; and removing the organic solvent contained in a distillation tank by reduced pressure distillation.

In the resin particle dispersion production method according to the present exemplary embodiment, the rate of pressure reduction during the reduced pressure distillation in an environment in which the pressure inside the distillation tank is equal to or higher than vapor pressure and equal to or lower than (the vapor pressure+5 kPa) when the concentration of the organic solvent in the phase-inverted emulsion is in the range of 30% by mass or less to 1% by mass or more is from 0.01 kPa/min to 0.5 kPa/min inclusive until the pressure inside the distillation tank reaches a preset reduced pressure for the reduced pressure distillation.

With the resin particle dispersion production method according to the present exemplary embodiment, a resin particle dispersion containing resin particles having a narrow particle size distribution can be obtained with a high yield. The reason for this may be as follows.

The resin particle dispersion is produced, for example, by dissolving the resin in an organic solvent, mixing the resulting solution with water to cause phase inversion emulsification to occur to thereby disperse the resin finely in the aqueous medium, and then removing the organic solvent by reduced pressure distillation.

In the reduced pressure distillation of the phase-inverted emulsion containing the organic solvent, the resin particles are present around bubbles generated when the organic solvent evaporates. When the interfacial tension of the bubbles is high, excessive foaming occurs in the distillation tank, and the resin is mixed into the distillate due to entrainment in some cases. This may cause a reduction in the yield.

This phenomenon can be prevented by reducing the rate of pressure reduction to reduce the rate of distillation. However, if the rate of distillation is excessively low, the resin particles in the phase-inverted emulsion are held in a region in which the oil phase and the water phase are unstable for a long time, and the particle size distribution of the resin particles may deteriorate.

Therefore, in the resin particle dispersion production method according to the present exemplary embodiment, the rate of pressure reduction during the reduced pressure distillation in an environment in which the pressure inside the distillation tank is equal to or higher than vapor pressure and equal to or lower than (the vapor pressure+5 kPa) when the concentration of the organic solvent in the phase-inverted emulsion is in the range of 30% by mass or less to 1% by mass or more is from 0.01 kPa/min to 0.5 kPa/min inclusive until the pressure inside the distillation tank reaches a preset reduced pressure for the reduced pressure distillation.

When the concentration of the organic solvent in the phase-inverted emulsion is in the range of 30% by mass or less and 1% by mass or more, excessive foaming occurs.

Therefore, the rate of pressure reduction when the concentration of the organic solvent in the phase-inverted emulsion is in the above range is reduced to 0.5 kPa/min or lower to prevent the excessive foaming, and the resin is thereby prevented from being mixed into the distillate by entrainment. This can prevent a reduction in the yield.

By setting the rate of pressure reduction when the concentration of the organic solvent in the phase-inverted emulsion is in the above range to 0.01 kPa/min or higher, the resin particles in the phase-inverted emulsion are prevented from being held in the region in which the oil phase and the water phase are unstable for a long time, so that deterioration of the particle size distribution of the resin particles is prevented.

However, when the pressure in the environment in the distillation tank exceeds the vapor pressure, excessive foaming does not occur. Therefore, the rate of pressure reduction may be higher than 0.5 kPa/min until the pressure in the environment in the distillation tank reaches the vapor pressure.

After the pressure has reached the preset reduced pressure for the reduced pressure distillation, the distillation is continued while the pressure inside the distillation tank is maintained, so that the rate of pressure reduction is set to less than 0.01 kPa/min in order to prevent fluctuations of the pressure.

It is inferred from the above that, with the resin particle dispersion production method according to the present exemplary embodiment, a resin particle dispersion including resin particles having a narrow particle size distribution can be obtained with a high yield.

In the resin particle dispersion obtained by the resin particle dispersion production method according to the present exemplary embodiment, the resin particles have a narrow particle size distribution. Therefore, when the resin particle dispersion is used for a toner (particularly for an emulsification aggregation method used as a toner production method), a toner having a narrow particle size distribution is obtained.

The resin particle dispersion production method according to the present exemplary embodiment will be described in detail.

(Phase-Inverted Emulsion Preparation Step)

In the phase-inverted emulsion preparation step, the phase-inverted emulsion is prepared by subjecting the resin to phase inversion emulsification using the organic solvent and the aqueous medium.

The phase-inverted emulsion is obtained by a phase inversion emulsification method.

In the phase inversion emulsification method, the aqueous medium (i.e., the W phase) is added to an oil phase dispersion (i.e., a resin solution used as the O phase) that is a continuous phase containing the resin dissolved in an organic solvent capable of dissolving the resin to thereby subject the resin to conversion (i.e., phase inversion) from W/O to O/W. The oil phase dispersion is thereby converted to a discontinuous phase, and the resin is dispersed as particles in the aqueous medium.

Examples of the method for producing the phase-inverted emulsion include the following methods.

1) The resin is dissolved in the organic solvent, and the neutralizer is added to the obtained resin solution to neutralize the resin. Then the aqueous medium is added to the resin solution to perform phase inversion emulsification.

2) The resin is dissolved in a solvent containing the organic solvent, part of the neutralizer, and the aqueous medium to neutralize the resin, and the aqueous medium is added to the resin solution to perform phase inversion emulsification.

3) The resin is dissolved in the organic solvent, and the neutralizer is added to the obtained resin solution to neutralize the resin. Then the aqueous medium is added to the resin solution, and the temperature of the mixture is changed under stirring to perform phase inversion emulsification.

The phase-inverted emulsion is produced using a well-known emulsification device such as an emulsification tank equipped with agitation impellers.

When the resin is dissolved in the organic solvent, the aqueous medium and the neutralizer may be mixed with the resin and the organic solvent.

No particular limitation is imposed on the order of addition of the resin and the organic solvent to the emulsification tank. When the resin easily dissolves in the organic solvent, the resin may be added after all the organic solvent or part of the organic solvent has been added, from the viewpoint of dissolving time.

The tube used to add the resin to the emulsification tank can be freely selected in consideration of, for example, the diameter of the pulverized resin to be added. For example, to prevent dust particles from flying during addition of the resin, a tube that can be lowered to a lower portion of the emulsification tank may be used.

No particular limitation is imposed on the position, number, and shape of nozzles used to add water to the resin solution obtained by dissolving the resin to the organic solvent. For example, the nozzles may be immersed in the solution. When a large-scale facility is used, two or more tubes may be used to add water, or a nozzle having a showerhead may be used to add water from an upper portion of the emulsification tank such that the water is sprayed over the surface of the solution.

—Resin—

Any resin that can undergo phase inversion emulsification can be used.

Examples of the resin include: vinyl-based resins composed of homopolymers of monomers such as styrenes (such as styrene, p-chlorostyrene, and α-methylstyrene), (meth)acrylates (such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (such as acrylonitrile and methacrylonitrile), vinyl ethers (such as vinyl methyl ether and vinyl isobutyl ether), vinyl ketones (such as vinyl methyl ketone, vinyl ethyl ketone, and vinyl isopropenyl ketone), and olefins (such as ethylene, propylene, and butadiene); and vinyl-based resins composed of copolymers of combinations of two or more of the above monomers.

Other examples of the resin include: non-vinyl-based resins such as epoxy resins, polyester resins, polyurethane resins, polyamide resins, cellulose resins, polyether resins, and modified rosins; mixtures of the non-vinyl-based resins and the above-described vinyl-based resins; and graft polymers obtained by polymerizing a vinyl-based monomer in the presence of any of these resins.

One of these resins may be used alone, or two or more of them may be used in combination.

The resin may have a polar group such as a carboxyl group, a sulfonic acid group, or a hydroxy group. In particular, the resin may have an acid value.

The resin used may be an amorphous resin. However, a crystalline resin (such as a crystalline polyester resin) may be used.

The amorphous resin exhibits only a stepwise endothermic change instead of a clear endothermic peak in thermal analysis measurement using differential scanning calorimetry (DSC), is a solid at room temperature, and is thermoplastic at temperature equal to or higher than its glass transition temperature.

The crystalline resin exhibits a clear endothermic peak instead of a stepwise endothermic change in the differential scanning calorimetry (DSC).

Specifically, the crystalline resin means that, for example, the half width of the endothermic peak measured at a heating rate of 10° C./minute is 10° C. or less, and the amorphous resin means a resin in which the half width exceeds 10° C. or a resin in which a clear endothermic peak is not observed.

The amorphous resin will be described.

Examples of the amorphous resin include well-known amorphous resins such as amorphous polyester resins, amorphous vinyl resins (such as styrene-acrylic resins), epoxy resins, polycarbonate resins, and polyurethane resins. Of these, amorphous polyester resins, and amorphous vinyl resins (particularly styrene-acrylic resins) resins are preferred, and amorphous polyester resins are more preferred.

The amorphous resin may be a combination of an amorphous polyester resin and a styrene-acrylic resin. Moreover, the amorphous resin used may be an amorphous resin having an amorphous polyester resin segment and a styrene acrylic resin segment.

—Amorphous Polyester Resin—

The amorphous polyester resin is, for example, a polycondensation product of a polycarboxylic acid and a polyhydric alcohol. The amorphous polyester resin used may be a commercial product or a synthesized product.

Examples of the polycarboxylic acid include aliphatic dicarboxylic acids (such as oxalic acid, malonic acid, maleic acid, fumaric acid, citraconic acid, itaconic acid, glutaconic acid, succinic acid, alkenyl succinic acids, adipic acid, and sebacic acid), alicyclic dicarboxylic acids (such as cyclohexanedicarboxylic acid), aromatic dicarboxylic acids (such as terephthalic acid, isophthalic acid, phthalic acid, and naphthalenedicarboxylic acid), anhydrides thereof, and lower alkyl (having, for example, 1 to 5 carbon atoms) esters thereof. In particular, the polycarboxylic acid may be an aromatic dicarboxylic acid.

The polycarboxylic acid used may be a combination of a dicarboxylic acid and a tricarboxylic or higher polycarboxylic acid having a crosslinked or branched structure. Examples of the tricarboxylic or higher polycarboxylic acid include trimellitic acid, pyromellitic acid, anhydrides thereof, and lower alkyl (having, for example, 1 to 5 carbon atoms) esters thereof.

One of these polycarboxylic acids may be used alone, or two or more of them may be used in combination.

Examples of the polyhydric alcohol include aliphatic diols (such as ethylene glycol, diethylene glycol, triethylene glycol, propylene glycol, butanediol, hexanediol, and neopentyl glycol), alicyclic diols (such as cyclohexanediol, cyclohexanedimethanol, and hydrogenated bisphenol A), and aromatic diols (such as an ethylene oxide adduct of bisphenol A and a propylene oxide adduct of bisphenol A). In particular, the polyhydric alcohol is, for example, preferably an aromatic diol or an alicyclic diol and more preferably an aromatic diol.

The polyhydric alcohol used may be a combination of a diol and a trihydric or higher polyhydric alcohol having a crosslinked or branched structure. Examples of the trihydric or higher polyhydric alcohol include glycerin, trimethylolpropane, and pentaerythritol.

One of these polyhydric alcohols may be used alone, or two or more of them may be used in combination.

The amorphous polyester resin is obtained by a well-known production method. Specifically, the amorphous polyester resin is obtained, for example, by the following method. The polymerization temperature is set to from 180° C. to 230° C. inclusive. If necessary, the pressure inside the reaction system is reduced, and the reaction is allowed to proceed while water and alcohol generated during condensation are removed. When the raw material monomers are not dissolved or not compatible with each other at the reaction temperature, a high-boiling point solvent may be added as a solubilizer to dissolve the monomers. In this case, the polycondensation reaction is performed while the solubilizer is removed by evaporation. When a monomer with poor compatibility is present during the copolymerization reaction, the monomer with poor compatibility and an acid or an alcohol to be polycondensed with the monomer are condensed in advance, and then the resulting polycondensation product and the rest of the components are subjected to polycondensation.

The properties of the resin will be described.

The acid value of the resin is preferably from 8 mg KOH/g to 20 mg KOH/g inclusive and more preferably from 10 mg KOH/g to 16 mg KOH/g inclusive.

The acid value is determined by a neutralization titration method specified in JIS K0070 (1992).

Specifically, the acid value is determined as follows.

An appropriate amount of a sample is collected, and 100 mL of a solvent (a solution mixture of diethyl ether/ethanol) and a few drops of an indicator (phenolphthalein solution) are added. Then the mixture is well-shaken in a water bath until the sample is completely dissolved. The mixture is titrated with a 0.1 mol/L potassium hydroxide ethanol solution. The point when the light red color of the indicator does not disappear for 30 seconds is defined as the end point. The acid value is denoted as A, and the weight of the sample is denoted as S (g). The volume of the 0.1 mol/L potassium hydroxide ethanol solution used for the titration is denoted as B (mL), and the factor of the 0.1 mol/L potassium hydroxide ethanol solution is denoted as f. Then the acid value is computed as $A=(B \times f \times 5.611)/S$.

The glass transition temperature (Tg) of the resin is preferably from 50° C. to 80° C. inclusive and more preferably from 50° C. to 65° C. inclusive.

The glass transition temperature is measured using a differential scanning calorimeter (DSC3110 manufactured by Mac Science Co., Ltd., thermal analysis system 001) according to JIS 7121-1987. The melting point of a mixture of indium and zinc is used to correct the temperature of a detection unit of the above apparatus, and the heat of fusion of indium is used to correct the amount of heat. A sample is placed in an aluminum pan. The aluminum pan with the sample placed therein and an empty reference pan are set in the apparatus, and the measurement is performed at a heating rate of 10° C./min.

The glass transition temperature is defined as the temperature at the intersection of the base line in an endothermic portion in the DSC curve obtained by the measurement and an extension of a rising line.

The weight average molecular weight (Mw) of the resin is preferably from 5000 to 1000000 inclusive and more preferably from 7000 to 500000 inclusive.

The number average molecular weight (Mn) of the resin may be from 2000 to 100000 inclusive.

The molecular weight distribution Mw/Mn of the resin is preferably from 1.5 to 100 inclusive and more preferably from 2 to 60 inclusive.

The weight average molecular weight and the number average molecular weight are measured by gel permeation chromatography (GPC). In the molecular weight measurement by GPC, a GPC measurement apparatus HLC-8120GPC manufactured by TOSOH Corporation is used. A TSKgel Super HM-M (15 cm) column manufactured by TOSOH Corporation and a THF solvent are used. The weight average molecular weight and the number average molecular weight are computed from the measurement results using a molecular weight calibration curve produced using monodispersed polystyrene standard samples.

No particular limitation is imposed on the amount of the resin used, and the amount may be appropriately selected according to the concentration of solids in the resin particle dispersion to be obtained.

—Neutralizer—

Examples of the neutralizer include basic compounds capable of neutralizing polar groups in the resin such as carboxyl groups, sulfonic acid groups, or hydroxy groups.

Specific examples of the neutralizer include organic bases and inorganic alkalis.

Examples of the organic base include triethanolamine, diethanolamine, N-methyldiethanolamine, and dimethylethanolamine.

Examples of the inorganic alkali include hydroxides of alkali metals (such as sodium hydroxide, lithium hydroxide, and potassium hydroxide), carbonates (such as sodium carbonate and sodium hydrogencarbonate), and ammonia.

To prevent hydrolysis of the resin, the neutralizer is preferably an amine, which is a weak base, and more preferably ammonia. Particularly preferably, ammonia in the form of an aqueous ammonia solution is added.

The rate of neutralization of the resin with the neutralizer is 60% or more and less than 150%. From the viewpoint of improving the yield and narrowing the size distribution, the neutralization rate is preferably 60% or more and less than 145% and still more preferably 65% or more and 130% or less.

Specifically, the neutralizer is used such that the rate of neutralization of the resin falls within the above range.

The acid value of the resin is denoted as AV [mg-KOH/g-resin], and the valence of the neutralizer (i.e., a basic material) added is denoted as n. The molecular weight of the neutralizer (i.e., the basic material) added is denoted as Mwb. The amount of the neutralizer (i.e., the basic material) added per 1 g of the resin is denoted as mb [g]. Then the rate of neutralization of the resin is computed using the following formula.

The rate of neutralization of the resin [%]=mb×n×56.1/Mwb/AV×1000

—Organic Solvent—

Examples of the organic solvent include well-known solvents used for phase inversion emulsification.

From the viewpoint of improving the solubility of the resin, the organic solvent contains preferably at least one organic solvent selected from the group consisting of esters and ketones and at least one organic solvent selected from the group consisting of alcohols and contains more preferably at least one organic solvent selected from the group consisting of ketones and at least one organic solvent selected from alcohols.

Examples of the ester include ethyl acetate, butyl acetate, propyl acetate, and isopropyl acetate.

Examples of the ketone include acetone, methyl ethyl ketone, cyclohexanone, butanone, and methyl isobutyl ketone.

Examples of the alcohol include methanol, ethanol, isopropyl alcohol, n-propanol, n-butanol, diacetone alcohol, and 2-ethylhexanol.

—Aqueous Medium—

The aqueous medium used is, for example, water (such as distilled water or ion exchanged water).

The amount of water added to the oil phase medium prepared by dissolving the resin in the organic solvent is set to, for example, an amount that allows phase inversion emulsification to proceed and the amount of waste generated to decrease.

Specifically, the amount of water added is preferably from 50% by mass to 2000% by mass inclusive and more preferably from 100% by mass to 1000% by mass inclusive based on the mass of the resin.

(Organic Solvent Removal Step)

In the organic solvent removal step, the organic solvent is removed from the phase-inverted emulsion contained in the distillation tank by reduced pressure distillation.

A well-known reduced pressure distillation method may be used, such as a method in which a reduced pressure distillation bath equipped with an agitating unit is used to perform reduced pressure distillation while the phase-inverted emulsion is bubbled with an inert gas or a method in which a so-called wall wetter is used to draw up the phase-inverted emulsion in the reduced pressure distillation bath to an upper portion of the bath to form a liquid film on a heat transfer surface of the bath in a portion above the liquid level to thereby perform reduced pressure distillation.

During the reduced pressure distillation, the rate of pressure reduction in an environment in which the pressure inside the distillation tank is equal to or higher than vapor pressure and equal to or lower than (the vapor pressure+5 kPa) when the concentration of the organic solvent in the phase-inverted emulsion is in the range of 30% by mass or less to 1% by mass or more is from 0.01 kPa/min to 0.5 kPa/min inclusive until the pressure inside the distillation tank reaches a preset reduced pressure for the reduced pressure distillation.

From the viewpoint of improving the yield and narrowing the particle size distribution, the rate of pressure reduction is more preferably from 0.05 kPa/min to 0.4 kPa/min inclusive.

The rate of pressure reduction is controlled, for example, by changing the pressure inside the distillation tank.

The pressure inside the distillation tank is controlled using a vacuum pump connected to the distillation tank through a condenser for condensing the evaporated organic solvent and at least a regulating valve connected between the condenser and the vacuum pump.

During the reduced pressure distillation, the vacuum pump may be operated intermittently or continuously. In this case, air or an inert gas may also be introduced into the distillation tank to control the pressure inside the distillation tank.

To reduce the volume of a flow containing a trace amount of uncondensed gas to a facility for treating the uncondensed gas, the pressure inside the distillation tank may be controlled using a first regulation valve connected on the distillation tank side and a second regulation valve connecting an outlet of the vacuum pump to an inlet of the vacuum pump.

The temperature of the phase-inverted emulsion during the reduced pressure distillation is preferably from 30° C. to 70° C. inclusive and more preferably from 35° C. to 65° C. inclusive.

When the temperature of the phase-inverted emulsion during the reduced pressure distillation is 30° C. or higher, the degree of reduction in the evaporation ratio of the organic solvent during the reduced pressure distillation is reduced.

When the temperature of the phase-inverted emulsion during the reduced pressure distillation is 70° C. or lower, fusion of the resin particles and hydrolysis of the resin are prevented, and the particle size distribution of the resin particles can be easily narrowed.

The heating temperature at which a tank wall of the distillation tank is heated during the reduced pressure distillation is preferably from 50° C. to 95° C. inclusive and more preferably from 55° C. to 90° C. inclusive.

When the heating temperature at which the tank wall of the distillation tank is heated during the reduced pressure distillation is from 50° C. to 95° C. inclusive, the yield is improved.

The heating temperature at which the tank wall of the distillation tank is heated corresponds to the temperature of a heating fluid in a jacket for heating the tank wall of the distillation tank by causing the heating fluid to flow inside the jacket. More specifically, the heating temperature is the temperature of the heating fluid at an introduction port for introducing the heating fluid to the jacket (this temperature may be referred to also as "jacket inlet temperature").

The organic solvent is removed from the phase-inverted emulsion by the reduced pressure distillation described above, and a resin particle dispersion is thereby obtained.

After the removal of the organic solvent, the collected organic solvent, the collected neutralizer, the collected aqueous medium, etc. may be re-used for the production of the phase-inverted emulsion. In this manner, the cost and the environmental load may be reduced.

A surfactant may be added to the obtained resin particle dispersion.

When the resin particle dispersion contains a surfactant, the dispersibility of the resin particles may be increased, and the storage stability of the dispersion may be improved.

Examples of the surfactant include various surfactants such as anionic surfactants, amphoteric surfactants, cationic surfactants, and nonionic surfactants.

Of these, anionic surfactants may be used from the viewpoint of improving the storage stability of the resin particle dispersion.

Examples of the anionic surfactant include carboxylic acid-type anionic surfactants, sulfate-type anionic surfactants, sulfonate-type anionic surfactants, and phosphate-type anionic surfactants.

Specific examples of the anionic surfactant include fatty acid salts, rosin acid salts, naphthenic acid salts, ether carboxylic acid salts, alkenyl succinic acid salts, primary alkyl sulfates, secondary alkyl sulfates, polyoxyethylene alkyl sulfates, polyoxyethylene alkylphenyl sulfates, monoacylglycerol sulfates, acylamino sulfates, sulfated oils, sulfated fatty acid alkyl esters, α-olefin sulfonates, secondary alkane sulfonates, α-sulfofatty acid salts, acyl isethionates, dialkyl sulfosuccinates, alkylbenzenesulfonates, alkylnaphthalenesulfonates, alkyl diphenyl ether disulfonates, petroleum sulfonates, lignin sulfonates, alkyl phosphates, polyoxyethylene alkyl phosphates, polyoxyethylene alkylphenyl phosphates, perfluoroalkyl carboxylates, perfluoroalkyl sulfonates, and perfluoroalkyl phosphates.

Of these, sulfate-type or sulfonate-type anionic surfactants are more preferable, and sulfonate-type anionic surfactants are particularly preferable, from the viewpoint of improving the storage stability of the resin particle dispersion.

From the viewpoint of improving the storage stability of the resin particle dispersion, the content of the surfactant is preferably from 0.1% by mass to 10% by mass inclusive and more preferably from 0.5% by mass to 5% by mass inclusive based on the mass of the resin.

(Properties of Resin Particle Dispersion)

The volume average particle diameter of the resin particles in the resin particle dispersion according to the present exemplary embodiment is preferably from 65 nm to 220 nm inclusive and more preferably from 90 nm to 200 nm inclusive.

In the resin particle dispersion according to the present exemplary embodiment, even when the volume average particle diameter of the resin particles is in the above range, the yield is high, and the resin particle dispersion has a narrow particle size distribution.

The volume average particle diameter of the resin particles is measured as follows. A particle size distribution measured using a laser diffraction particle size measurement apparatus (e.g., LA-700 manufactured by HORIBA Ltd.) is used and divided into different particle diameter ranges (channels), and a cumulative volume distribution is computed from the small particle diameter side. The particle diameter at which the cumulative frequency is 50% relative to the total number of particles is measured as the volume average particle diameter D50v.

In the resin particle dispersion according to the present exemplary embodiment, the content of the residual organic solvent is preferably 3000 ppm or lower and more preferably 1500 ppm or lower. The lower limit of the content of the residual organic solvent is 0 ppm. However, from the viewpoint of reducing the cost for reducing the amount of the residual organic solvent, the lower limit is, for example, 25 ppm or more. The term "ppm" means the mass ratio in the resin particle dispersion after the organic solvent removal step.

When the content of the residual organic solvent in the resin particle dispersion is 3000 ppm or less, aggregation of the resin particles may be prevented, and the storage stability of the resin particle dispersion may be improved.

To adjust the content of the residual organic solvent to the above range, for example, a method may be used in which the amount of the distillate to be collected is computed in advance using the amount of the phase-inverted emulsion before distillation and the amount of the organic solvent component contained in the phase-inverted emulsion.

The concentration of solids in the resin particle dispersion according to the present exemplary embodiment may be appropriately selected as needed. The solid concentration is preferably from 1% by mass to 60% by mass inclusive, more preferably from 5% by mass to 50% by mass inclusive, and particularly preferably from 10% by mass to 50% by mass inclusive.

(Applications)

The resin particle dispersion production method according to the present exemplary embodiment is typically used as a method for producing a resin particle dispersion for a toner.

Other examples of the application of the method include methods for producing resin particle dispersions for inkjet inks, cosmetics, powder coatings, various coatings, and electronic paper inks.

<Toner Production Method/Toner>

A toner production method according to an exemplary embodiment includes the steps of:

forming aggregated particles by aggregating, in a dispersion containing resin particles in a resin particle dispersion obtained by the resin particle dispersion production method according to the preceding exemplary embodiment, at least the resin particles (this step is hereinafter referred to as an aggregated particle forming step);

and fusing and coalescing the aggregated particles by heating an aggregated particle dispersion containing the aggregated particles dispersed therein to thereby form toner particles (this step is hereinafter referred to as a fusion/coalescence step).

A toner according to an exemplary embodiment contains toner particles obtained by the toner production method according to the above exemplary embodiment.

The above steps will next be described in detail. In the following description, a method for obtaining toner particles containing a coloring agent and a release agent will be described, but the coloring agent and the release agent are used optionally. Of course, additional additives other than the coloring agent and the release agent may be used.

—Resin Particle Dispersion Preparing Step—

In a resin particle dispersion preparing step, a resin particle dispersion, a coloring agent particle dispersion, and a release agent particle dispersion are prepared.

—Resin Particle Dispersion—

The resin particle dispersion is produced using the resin particle dispersion production method according to the preceding exemplary embodiment.

However, a resin particle dispersion other than the resin particle dispersion obtained using the resin particle dispersion production method according to the preceding exemplary embodiment may also be used.

—Coloring Agent Particle Dispersion

The coloring agent particle dispersion is a dispersion obtained by dispersing a coloring agent in at least an aqueous medium.

Examples of the coloring agent include: various pigments such as carbon black, chrome yellow, Hansa yellow, benzidine yellow, threne yellow, quinoline yellow, pigment yellow, permanent orange GTR, pyrazolone orange, vulcan orange, watchung red, permanent red, brilliant carmine 3B, brilliant carmine 6B, DuPont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate; and various dyes such as acridine-based dyes, xanthene-based dyes, azo-based dyes, benzoquinone-based dyes, azine-based dyes, anthraquinone-based dyes, thioindigo-based dyes, dioxazine-based dyes, thiazine-based dyes, azomethine-based dyes, indigo-based dyes, phthalocyanine-based dyes, aniline black-based dyes, polymethine-based dyes, triphenylmethane-based dyes, diphenylmethane-based dyes, and thiazole-based dyes.

One of these coloring agents may be used alone, or two or more of them may be used in combination.

The coloring agent is dispersed in an aqueous medium using a well-known method. For example, a rotary shearing-type homogenizer, a media-type disperser such as a ball mill, a sand mill, or an attritor, or a high-pressure counter collision-type disperser may be used. The coloring agent may be dispersed in the aqueous medium using a polar ionic surfactant and using a homogenizer to thereby produce the coloring agent particle dispersion.

The volume average particle diameter of the coloring agent is preferably 1 μm or less, more preferably 0.5 μm or less, and particularly preferably from 0.01 μm to 0.5 μm inclusive.

A dispersant may be added in order to improve the dispersion stability of the coloring agent in the aqueous medium to thereby reduce the energy of the coloring agent in the toner, and examples of the dispersant include rosin, rosin derivatives, coupling agents, and polymeric dispersants.

—Release Agent Particle Dispersion

The release agent particle dispersion is a dispersion obtained by dispersing a release agent in at least an aqueous medium.

Examples of the release agent include: hydrocarbon-based waxes; natural waxes such as carnauba wax, rice wax, and candelilla wax; synthetic and mineral/petroleum-based waxes such as montan wax; and ester-based waxes such as fatty acid esters and montanic acid esters. The release agent used is not limited to the above release agents.

One of these release agents may be used alone, or two or more of them may be used in combination.

The melting temperature of the release agent is preferably from 50° C. to 110° C. inclusive and more preferably from 60° C. to 100° C. inclusive.

The melting temperature is determined using a DSC curve obtained by differential scanning calorimetry (DSC) from "peak melting temperature" described in melting temperature determination methods in "Testing methods for transition temperatures of plastics" in JIS K7121-1987.

The release agent is dispersed in the aqueous medium using a well-known method. For example, a rotary shearing-type homogenizer, a media-type disperser such as a ball mill, a sand mill, or an attritor, or a high-pressure counter collision-type disperser may be used. The release agent may be dispersed in the aqueous medium using a polar ionic surfactant and using a homogenizer to thereby produce the release agent particle dispersion.

The volume average particle diameter of the release agent particles is preferably 1 μm or less and more preferably from 0.01 μm to 1 μm inclusive.

—Aggregated Particle Forming Step—

Next, the resin particle dispersion, the coloring agent particle dispersion, and the release agent particle dispersion are mixed.

Then the resin particles, the coloring agent particles, and the release agent particles are hetero-aggregated in the dispersion mixture to form aggregated particles containing the resin particles, the coloring agent particles, and the release agent particles and having diameters close to the diameters of target toner particles.

Specifically, for example, a flocculant is added to the dispersion mixture, and the pH of the dispersion mixture is adjusted to acidic (for example, a pH of from 2 to 5 inclusive). Then a dispersion stabilizer is optionally added, and the resulting mixture is heated to the glass transition temperature of the resin particles (specifically, for example, a temperature equal to higher than the glass transition temperature of the resin particles −30° C. and equal to or lower than the glass transition temperature −10° C.) to aggregate the particles dispersed in the dispersion mixture to thereby form aggregated particles.

In the aggregated particle forming step, for example, the flocculant is added at room temperature (e.g., 25° C.) while the dispersion mixture is agitated in a rotary shearing-type homogenizer. Then the pH of the dispersion mixture is adjusted to acidic (e.g., a pH of from 2 to 5 inclusive), and the dispersion stabilizer is optionally added. Then the resulting mixture is heated in the manner described above.

Examples of the flocculant include a surfactant with a polarity opposite to the polarity of the surfactant added to the dispersion mixture, inorganic metal salts, and divalent or higher polyvalent metal complexes. In particular, when a metal complex is used as the flocculant, the amount of the surfactant used can be reduced, and charging characteristics may be improved.

An additive that forms a complex with a metal ion in the flocculant or a similar bond may be optionally used. The additive used may be a chelating agent.

Examples of the inorganic metal salts include: metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

The chelating agent used may be a water-soluble chelating agent. Examples of the chelating agent include: oxycarboxylic acids such as tartaric acid, citric acid, and gluconic acid; iminodiacetic acid (IDA); nitrilotriacetic acid (NTA); and ethylenediaminetetraacetic acid (EDTA).

The amount of the chelating agent added is, for example, preferably from 0.01 parts by mass to 5.0 parts by mass inclusive and more preferably 0.1 parts by mass or more and less than 3.0 parts by mass based on 100 parts by mass of the resin particles.

—Fusion/Coalescence Step—

Next, the aggregated particle dispersion containing the aggregated particles dispersed therein is heated, for example, to a temperature equal to or higher than the glass transition temperature of the resin particles (e.g., a temperature higher by 10° C. to 30° C. than the glass transition temperature of the resin particles) to fuse and coalesce the aggregated particles to thereby form toner particles.

The toner particles are obtained through the above-described steps.

Alternatively, the toner particles may be produced through: the step of, after the preparation of the aggregated particle dispersion containing the aggregated particles dispersed therein, mixing the aggregated particle dispersion further with the resin particle dispersion containing the resin particles dispersed therein and then causing the resin particles to adhere to the surface of the aggregated particles to aggregate them to thereby form second aggregated particles; and the step of heating a second aggregated particle dispersion containing the second aggregated particles dispersed therein to fuse and coalesce the second aggregated particles to thereby form toner particles having a core-shell structure.

After completion of the fusion/coalescence step, the toner particles formed in the solution are subjected to a well-known washing step, a solid-liquid separation step, and a drying step to obtain dried toner particles.

From the viewpoint of chargeability, the toner particles may be subjected to displacement washing with ion exchanged water sufficiently in the washing step. No particular limitation is imposed on the solid-liquid separation step. From the viewpoint of productivity, suction filtration, pressure filtration, etc. may be performed in the solid-liquid separation step. No particular limitation is imposed on the drying step. From the viewpoint of productivity, freeze-drying, flash drying, fluidized drying, vibrating fluidized drying, etc. may be performed in the drying step.

The toner according to the present exemplary embodiment is produced, for example, by adding an external additive to the dried toner particles obtained and mixing them. The mixing may be performed, for example, using a V blender, a Henschel mixer, a Loedige mixer, etc. If necessary, coarse particles in the toner may be removed using a vibrating sieving machine, an air sieving machine, etc.

Examples of the external additive include inorganic particles. Examples of the inorganic particles include particles of $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)n$, $Al_2O_3 \cdot 2SiO_2$, $CaCO_3$, $MgCO_3$, $BaSO_4$, and $MgSO_4$.

The surface of the inorganic particles used as the external additive may be subjected to hydrophobic treatment. The hydrophobic treatment is performed, for example, by immersing the inorganic particles in a hydrophobic treatment agent. No particular limitation is imposed on the hydrophobic treatment agent, and examples of the hydrophobic treatment agent include silane-based coupling agents, silicone oils, titanate-based coupling agents, and aluminum-based coupling agents. One of these may be used alone, or two or more of them may be used in combination.

The amount of the hydrophobic treatment agent is generally, for example, from 1 part by mass to 10 parts by mass inclusive based on 100 parts by mass of the inorganic particles.

Other examples of the external additive include resin particles (particles of resins such as polystyrene, polymethyl methacrylate (PMMA), and melamine resins) and cleaning activators (such as metal salts of higher fatty acids typified by zinc stearate and fluorine-based polymer particles).

The amount of the external additive added externally is, for example, preferably from 0.01% by mass to 5% by mass inclusive and more preferably from 0.01% by mass to 2.0% by mass inclusive relative to the mass of the toner particles.

—Properties of Toner—

In the toner according to the present exemplary embodiment, the toner particles may have a single layer structure or may be toner particles each having a so-called core-shell structure including a core (core particle) and a coating layer (shell layer) covering the core.

The toner particles having the core-shell structure may each include, for example: a core containing the binder resin and optional additives such as the coloring agent and the release agent; and a coating layer containing the binder resin.

The volume average particle diameter (D50v) of the toner particles is preferably from 2 μm to 10 μm inclusive and more preferably from 4 μm to 8 μm inclusive.

The volume average particle diameters of the toner particles and their grain size distribution indexes are measured using Coulter Multisizer II (manufactured by Beckman Coulter, Inc.), and ISOTON-II (manufactured by Beckman Coulter, Inc.) is used as an electrolyte.

In the measurement, 0.5 mg to 50 mg of a measurement sample is added to 2 mL of a 5% aqueous solution of a surfactant (preferably sodium alkylbenzenesulfonate) serving as a dispersant. The mixture is added to 100 mL to 150 mL of the electrolyte.

The electrolyte with the sample suspended therein is subjected to dispersion treatment for 1 minute using an ultrasonic dispersion apparatus, and then the particle size distribution of particles having diameters within the range of 2 μm to 60 μm is measured using the Coulter Multisizer II with an aperture having an aperture diameter of 100 μm. The number of particles sampled is 50,000.

The particle size distribution measured and divided into particle size ranges (channels) is used to obtain volume-based and number-based cumulative distributions computed from the small diameter side. In the computed volume-based cumulative distribution, the particle diameter at a cumulative frequency of 16% is defined as a volume-based particle diameter D16v, and the particle diameter at a cumulative frequency of 50% is defined as a volume average particle diameter D50v. The particle diameter at a cumulative frequency of 84% is defined as a volume-based particle diameter D84v. In the number-based cumulative distribution, the particle diameter at a cumulative frequency of 16% is defined as a number-based particle diameter D16p, and the particle diameter at a cumulative frequency of 50% is defined as a number average cumulative particle diameter D50p. Moreover, the particle diameter at a cumulative frequency of 84% is defined as a number-based particle diameter D84p.

These are used to compute a volume-based grain size distribution index (GSDv) defined as $(D84v/D16v)^{1/2}$ and a number-based grain size distribution index (GSDp) defined as $(D84p/D16p)^{1/2}$.

The average circularity of the toner particles is preferably from 0.94 to 1.00 inclusive and more preferably from 0.95 to 0.98 inclusive.

The circularity of a toner particle is determined as (the peripheral length of an equivalent circle of the toner particle)/(the peripheral length of the toner particle) [i.e., (the peripheral length of a circle having the same area as a projection image of the particle)/(the peripheral length of the projection image of the particle)]. Specifically, the average circularity is a value measured by the following method.

First, the toner particles used for the measurement are collected by suction, and a flattened flow of the particles is formed. Particle images are captured as still images using flashes of light, and the average circularity is determined by subjecting the particle images to image analysis using a flow-type particle image analyzer (FPIA-3000 manufactured by SYSMEX Corporation). The number of particles sampled for determination of the average circularity is 3500.

When the toner contains the external additive, the toner (developer) for the measurement is dispersed in water containing a surfactant, and the dispersion is subjected to ultrasonic treatment. The toner particles with the external additive removed are thereby obtained.

<Electrostatic Image Developer>

An electrostatic image developer according to an exemplary embodiment contains at least the toner according to the preceding exemplary embodiment.

The electrostatic image developer according to the present exemplary embodiment may be a one-component developer containing only the toner according to the preceding exemplary embodiment or a two-component developer containing the toner and a carrier.

No particular limitation is imposed on the carrier, and a well-known carrier may be used. Examples of the carrier include: a coated carrier prepared by coating the surface of a core material formed of a magnetic powder with a coating resin; a magnetic powder-dispersed carrier prepared by dispersing a magnetic powder in a matrix resin; and a resin-impregnated carrier prepared by impregnating a porous magnetic powder with a resin.

In each of the magnetic powder-dispersed carrier and the resin-impregnated carrier, the particles included in the carrier may be used as cores, and the cores may be coated with a coating resin.

EXAMPLES

Examples of the present disclosure will be described. However, the present disclosure is not limited to these Examples. In the following description, "parts" and "%" are all based on mass, unless otherwise specified.

Example 1

Synthesis of Amorphous Polyester Resin
 Terephthalic acid: 69 parts
 Trimellitic acid: 31 parts
 Ethylene glycol: 43.5 parts
 1,5-Pentanediol: 45.5 parts The above materials are placed in a reaction vessel equipped with an agitator, a condenser, a nitrogen introduction tube, a thermometer, and a temperature controller. The temperature of the mixture is increased to 220° C. in a nitrogen flow over 1 hour, and 1 part of titanium tetraethoxide is added to 100 parts of the above materials. While water generated is removed by evaporation, the temperature of the mixture is increased to 240° C. over 0.5 hours. A dehydration condensation reaction is continued at 240° C. for 1 hour, and the reaction product is cooled. An amorphous polyester resin having an acid value of 12.5 mg KOH/g, a weight average molecular weight of 127000, and a glass transition temperature of 59° C. is thereby obtained.

<Production of Phase-Inverted Emulsion>

An agitating tank equipped with an agitator, a condenser, a thermometer, and a temperature controller is charged with 10 parts of the amorphous polyester resin used as the resin, 12 parts of methyl ethyl ketone (MEK), and 4 parts of isopropanol (IPA). Then the mixture is agitated at 50° C. for 30 minutes to dissolve the resin.

Ammonia water used as the neutralizer is added in an amount corresponding to 0.5% by mass of ammonia to the resin solution obtained. 20 Parts of water is added to the mixture under agitation to subject the resin to phase inversion emulsification, and a phase-inverted emulsion having an organic solvent concentration of 35% is thereby obtained.

<Production of Resin Particle Dispersion>

The phase-inverted emulsion is transferred to a distillation tank equipped with an agitator having a wall wetter impeller attached thereto, a condenser, a thermometer, a temperature controller, a pressure gage, a pressure regulating valve, and a vacuum pump. While a wetted wall is formed by agitation using the wall wetter impeller, the temperature of a jacket inlet is set to 70° C. to adjust the temperature of the phase-inverted emulsion in the tank to 50° C. Then the pressure inside the tank is reduced to vapor pressure to start distillation. While the rate of pressure reduction is controlled to 0.2 kPa/min in all the regions in which the concentration of the organic solvent in the tank is in the range of 35% or less and higher than 30%, in the range of 30% or lower and 1% or higher, and in the range of lower than 1% by mass, the pressure is reduced to the preset reduced pressure. The distillation is continued until the concentration of the organic solvent remaining in the phase-inverted emulsion reaches 3000 ppm, and a resin particle dispersion (1) is thereby obtained.

Examples 2 to 12 and Comparative Examples 1 to 2

Resin particle dispersions are produced using the same procedure as in Example 1 except that the reduced pressure distillation conditions are changed as shown in Table 1.

<<Evaluation>>

<Evaluation of Grain Size Distribution of Resin Particles in Resin Particle Dispersion>

A phase-inverted emulsion before reduced pressure distillation and the resin particle dispersion subjected to the reduced pressure distillation are diluted, and volume-based grain size distributions GSDv determined using NANOTRAC WAVE (manufactured by MicrotracBEL Corp.) are compared to judge the level of deterioration. The GSDv is computed as ((D84/D50)+(D50/D16))/2 determined from a volume-based frequency and evaluated according to the following criteria. G3Δ or higher is an allowable range.

G1⊙: The difference in the GSDv of the resin particles before and after reduced pressure distillation is less than 0.005.

G2◯: The difference in the GSDv of the resin particles before and after reduced pressure distillation is 0.005 or more and less than 0.01.

G3Δ: The difference in the GSDv of the resin particles before and after reduced pressure distillation is 0.01 or more and less than 0.02.

G4x: The difference in the GSDv of the resin particles before and after reduced pressure distillation is 0.02 or more.

<Evaluation of Yield>

The turbidities of resin particle solutions diluted to known solid contents are measured in advance to produce a calibration curve for determining the solid content from the turbidity. The turbidity of the organic solvent collected in a distillate is measured, and the ratio of the amount of the resin mixed into the distillate to the amount of the raw material resin is determined using the solid content. The yield is judged according to the following criteria, and 4 or higher is an allowable range.

G1⊙: The amount of the resin mixed into the distillate is less than 0.1% by mass.

G2◯: The amount of the resin mixed into the distillate is 0.1% by mass or more and less than 0.5% by mass.

G3Δ: The amount of the resin mixed into the distillate is 0.5% by mass or more and less than 1.0%.

G4x: The amount of the resin mixed into the distillate is 1.0% by mass or more.

TABLE 1

| | Resin particle dispersion | Pressure reduction rate when solvent concentration is 35 to 30% kPa/min | Pressure reduction rate when solvent concentration is 30 to 1% kPa/min | Pressure reduction rate when solvent concentration is less than 1% kPa/min | Maximum temperature of emulsion during distillation ° C. | Minimum temperature of emulsion during distillation ° C. | Temperature of jacket inlet ° C. | Grain size distribution Evaluation G | Yield Evaluation G |
|---|---|---|---|---|---|---|---|---|---|
| Comparative Example 1 | (13) | 0.6 | 0.6 | 0.6 | 50 | 42 | 70 | G1⊙ | G4X |
| Comparative Example 2 | (14) | 0.005 | 0.005 | 0.005 | 50 | 42 | 70 | G4X | G2◯ |
| Example 1 | (1) | 0.2 | 0.2 | 0.2 | 50 | 42 | 70 | G1⊙ | G1⊙ |
| Example 2 | (2) | 0.5 | 0.5 | 0.5 | 50 | 42 | 70 | G1⊙ | G3Δ |
| Example 3 | (3) | 0.01 | 0.01 | 0.01 | 50 | 42 | 70 | G3Δ | G2◯ |
| Example 4 | (4) | 0.7 | 0.2 | 0.2 | 50 | 42 | 70 | G1⊙ | G2◯ |
| Example 5 | (5) | 0.05 | 0.05 | 0.8 | 50 | 42 | 70 | G3Δ | G2◯ |
| Example 6 | (6) | 0.2 | 0.2 | 0.2 | 71 | 42 | 70 | G2◯ | G3Δ |
| Example 7 | (7) | 0.2 | 0.2 | 0.2 | 70 | 42 | 70 | G2◯ | G2◯ |
| Example 8 | (8) | 0.2 | 0.2 | 0.2 | 50 | 30 | 70 | G1⊙ | G3Δ |
| Example 9 | (9) | 0.2 | 0.2 | 0.2 | 50 | 29 | 70 | G2◯ | G3Δ |

TABLE 1-continued

|  | Resin particle dispersion | Pressure reduction rate when solvent concentration is 35 to 30% kPa/min | Pressure reduction rate when solvent concentration is 30 to 1% kPa/min | Pressure reduction rate when solvent concentration is less than 1% kPa/min | Maximum temperature of emulsion during distillation °C. | Minimum temperature of emulsion during distillation °C. | Temperature of jacket inlet °C. | Grain size distribution Evaluation G | Yield Evaluation G |
|---|---|---|---|---|---|---|---|---|---|
| Example 10 | (10) | 0.2 | 0.2 | 0.2 | 50 | 42 | 49 | G3△ | G1◎ |
| Example 11 | (11) | 0.2 | 0.2 | 0.2 | 50 | 42 | 50 | G2○ | G1◎ |
| Example 12 | (12) | 0.2 | 0.2 | 0.2 | 50 | 42 | 95 | G2○ | G3△ |

*When a target pressure is reached, the target pressure is maintained.

AS can be seen from the above results, in the Examples, the yield is higher than that in each Comparative Example, and the resin particle dispersion obtained contains resin particles having a narrower particle size distribution.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A method for producing a polyester resin particle dispersion, the method comprising:
    preparing a phase-inverted emulsion by phase inversion emulsification of a polyester resin using an organic solvent and an aqueous medium; and
    removing the organic solvent from the phase-inverted emulsion contained in a distillation tank by reduced pressure distillation,
    wherein, during the reduced pressure distillation, the rate of pressure reduction in an environment in which the pressure inside the distillation tank is equal to or higher than vapor pressure and equal to or lower than (the vapor pressure+5 kPa) when the concentration of the organic solvent in the phase-inverted emulsion is in the range of 30% by mass or less to 1% by mass or more is from 0.01 kPa/min to 0.5 kPa/min inclusive until the pressure inside the distillation tank reaches a preset reduced pressure for the reduced pressure distillation.

2. The method for producing a polyester resin particle dispersion according to claim 1, wherein the temperature of the phase-inverted emulsion during the reduced pressure distillation is from 30° C. to 70° C. inclusive.

3. The method for producing a polyester resin particle dispersion according to claim 1, wherein heating temperature at which a tank wall of the distillation tank is heated during the reduced pressure distillation is from 50° C. to 95° C. inclusive.

4. The method for producing a polyester resin particle dispersion according to claim 2, wherein heating temperature at which a tank wall of the distillation tank is heated during the reduced pressure distillation is from 50° C. to 95° C. inclusive.

5. The method for producing a polyester resin particle dispersion according to claim 1, wherein a polyester resin particle dispersion for a toner is produced.

6. The method for producing a polyester resin particle dispersion according to claim 2, wherein a polyester resin particle dispersion for a toner is produced.

7. The method for producing a polyester resin particle dispersion according to claim 3, wherein a polyester resin particle dispersion for a toner is produced.

8. The method for producing a polyester resin particle dispersion according to claim 4, wherein a polyester resin particle dispersion for a toner is produced.

9. A method for producing a toner for electrostatic image development, the method comprising:
    forming aggregated particles by aggregating, in a dispersion containing polyester resin particles in a polyester resin particle dispersion obtained by the polyester resin particle dispersion production method according to claim 1, at least the polyester resin particles;
    and fusing and coalescing the aggregated particles by heating an aggregated particle dispersion containing the aggregated particles dispersed therein to thereby form toner particles.

10. The method for producing a polyester resin particle dispersion according to claim 1, wherein the temperature of the phase-inverted emulsion during the reduced pressure distillation is from 42° C. to 70° C. inclusive.

11. The method for producing a polyester resin particle dispersion according to claim 1, wherein the temperature of the phase-inverted emulsion during the reduced pressure distillation reaches from 50° C. to 70° C. inclusive.

* * * * *